United States Patent [19]

Iwaya et al.

[11] Patent Number: 5,140,756
[45] Date of Patent: Aug. 25, 1992

[54] FLUIDIZED BED GRANULATOR

[75] Inventors: Shoichi Iwaya; Hitoshi Masumura, both of Yuri; Hiroki Takahashi, Honjou; Masaaki Ohkawara; Katsumi Kobayashi, both of Yokohama; Takashi Ito, Machida, all of Japan

[73] Assignees: TDK Corporation; Ohkawara Kakohki Co., Ltd., both of Japan

[21] Appl. No.: 309,670

[22] Filed: Jan. 25, 1989

[30] Foreign Application Priority Data

Jul. 6, 1987 [JP] Japan ................ 62-168277

[51] Int. Cl.⁵ ........................... F26B 19/00
[52] U.S. Cl. ........................... 34/60; 118/716; 118/57
[58] Field of Search .......... 34/10, 57 R, 57 A, 60; 159/3, 4.01, DIG. 3; 118/716, 303, 309, DIG. 5

[56] References Cited

U.S. PATENT DOCUMENTS 4,809,442 3/1989 Iwaya et al.

FOREIGN PATENT DOCUMENTS 4947087 12/1974 Japan.
505668 3/1975 Japan.

Primary Examiner—Henry A. Bennet
Attorney, Agent, or Firm—Parkhurst, Wendell & Rossi

[57] ABSTRACT

In conventional fluidized granulators whose housing is made of a steel plate, a powder tends to cause blocking if it is highly hygroscopic, and the bag filter used therein causes clogging. These problems have been solved in the present invention by forming the housing of a fluidized granulator with a porous membrane in place of the conventional steel plate. This fluidized granulator produces granules or a coated powder by spraying powder with water, a binder fluid or a coating fluid while maintaining the powder in a fluidized state.

6 Claims, 4 Drawing Sheets

FLUIDIZED BED GRANULATOR

TECHNICAL FIELD

The present invention relates to a fluidized bed granulator for producing granules or a coated powder by spraying a powder with water, a binder fluid or a coating fluid while maintaining the powder in a fluidized state.

The fluidized bed granulator referred to herein has a broad definition and includes a coating apparatus for producing a coated powder.

BACKGROUND ART

As the conventional fluidized bed granulators, there are known those shown in FIGS. 6 and 7.

Shown in FIG. 6 is a continuous type fluidized bed granulator, wherein a powder material A is fed into the housing 1 of the bed granulator by a powder feeder 6 and forms a fluidized bed 2 by the help of the hot air B blown into the housing 1 from the bottom of the housing 1. Into the fluidized bed 2 is sprayed a binder fluid C together with compressed air D from a nozzle 3, whereby granules as a granulation product is produced. The granules are taken out via a powder discharging device 11. An agitator 4 are provided in the fluidized bed 2, whereby the fluidized state of the fluidized bed 2 is maintained well. A pulse air type bag filter 5 is provided at the top of the housing 1, whereby powder-gas separation is effected and the separated gas is discharged.

FIG. 7 is a batchwise fluidized granulator. The difference of this granulator from that of FIG. 6 is that this granulator, being batchwise, has no powder feeder 6, no powder discharging device 11 and, in the fluidized bed 2, no agitator 4 but has a bag filter 5 with a shaking device 7 at the top of the housing 1.

In these conventional fluidized granulators, the housing is constituted by a steel plate made of stainless steel or the like, and a bag filter is provided at the top of the housing to prevent the scattering of fine powder.

In the above conventional fluidized granulators, the bag filter is ordinarily shaken in order to prevent its clogging. Since air feeding is temporarily stopped during the shaking, the powder in the fluidized bed comes to a stationary state, whereby the powder in the fluidized bed, when being a highly hygroscopic powder such as amino acid or the like, causes blocking in some cases.

In order to solve the above problem, a pulse air type bag filter is used in some cases. However, since a large number of bags are arranged at small intervals, there occurs deposition of powder between the bags, resulting in the clogging of the bags.

DISCLOSURE OF THE INVENTION

In order to solve the above problems of the conventional bed granulators, the present inventors made study and, as a result, found that the above problems can be solved by forming a portion or the whole portion of the housing of a bed granulator with a porous membrane. The finding has led to the completion of the present invention.

According to the present invention, there is provided a fluidized bed granulator for producing granules or a coated powder by spraying a powder with a binder fluid or a coating fluid while maintaining the powder in a fluidized state, the bed granulator being characterized in that at least a portion of its housing is formed by a porous membrane.

The conventional fluidized granulators have had functions of, for example, (1) granulation (particles are agglomerated by spraying them with a binder.
(2) coating (the surfaces of particles or a granulation product are coated with a coating agent to give them a color or a flavor taste),
(3) drying (a powder or a granulation product which is wet as a result of granulation or coating operation is dried), and
(4) cooling (a powder or a granulation product after drying is cooled). Recently, however, there have been developed fluidized bed granulators which in the above granulation operation (1), can perform one of the following granulation functions in addition to the conventional granulation in a fluidized bed.

(I) Tumbling granulation

Granulation is effected by spraying a binder into a fluidized bed whose bottom portion is being tumbled. This granulation can produce particles which are heavier, larger and more spherical than those obtained by the conventional fluidized granulation. In this case, the amount of air for fluidization can be smaller than in the conventional fluidized granulation or can be zero.

(II) Agitation granulation

A main impeller rotates along the inner bottom surface of a granulator to forcibly tumble a powder. An auxiliary impeller disintegrates large lumps. In this condition, a binder is sprayed and granulation is effected.

(III) Spouted bed granulation

As shown in FIG. 5, air is allowed to flow fast at the inner portion of a fluidized bed in an inner cylinder 15 to give particles an upward flow and is allowed to flow slowly at the portion of the fluidized bed close to the side wall of a housing to give the particles a downward flow. A binder is fed from an inlet 16 at the center of the bottom of the housing. 5 is a bag filter and 17 is a perforated plate through which air is fed.

Fluidized granulators which have two or all of the above granulation functions (I), (II) and (III) in combination are also in use. The present invention relates to a fluidized bed granulator of broad definition which include these functions, and it is used in an appropriate embodiment depending upon the size, shape, etc. of particles to be obtained.

Preferably, the porous membrane used in the present invention is heat-resistant and has very little adhesion for the powder.

That is, since the hot air introduced into the fluidized bed granulator ordinarily has about 40°–120° C. at the inlet and about 25°–80° C. at the outlet, the porous membrane must withstand these temperatures. Further, since a fine powder constantly adheres to and deposits on the porous membrane, it must have very little adhesion for the powder to ensure continuous operation. It is further preferable that the porous membrane be fitted detachably and be releasable when necessary because the membrane is wasted owing to the continuous use. The porous membrane is to separate a fine powder which is a product, from a gas.

The porous membrane having such functions has no particular restriction with respect to its type. But there are ordinarily used a fiber-made cloth such as woven cloth, unwoven cloth or the like. As the material for the woven or unwoven cloth, there are preferably used a polyimide, a heat-resistant nylon, a polyester and an aramid. As a preferable porous membrane, there is used a membrane obtained by laminating a reticulate film of very little adhesion for the powder and a woven or unwoven cloth as a reinforcing material. As the reticulate film, there are preferably used a film of polytetrafluoroethylene (PTFE) (TEFLON, Brand name) and a film of polytrifluoroethylene.

It is further preferable that from the standpoint of the removal of static electricity, the porous membrane be treated so as to have electroconductivity, that is, the membrane be electrically grounded or coated with an electroconductive coating.

It is furthermore preferable that the porous membrane be storable in a folded form and, when in operation, be swollen by making the inside pressure positive. The specific pressure difference between the inside and the outside of the porous membrane is desired to be 5-300 mm Aq., preferably 7-200 mm Aq. so that there occurs no leakage of fine powder and the porous membrane can retain a desired shape.

DETAILED DESCRIPTION OF THE PREFERRED EMBODIMENTS

The present invention is described in detail below referring to Examples.

Figure 1:
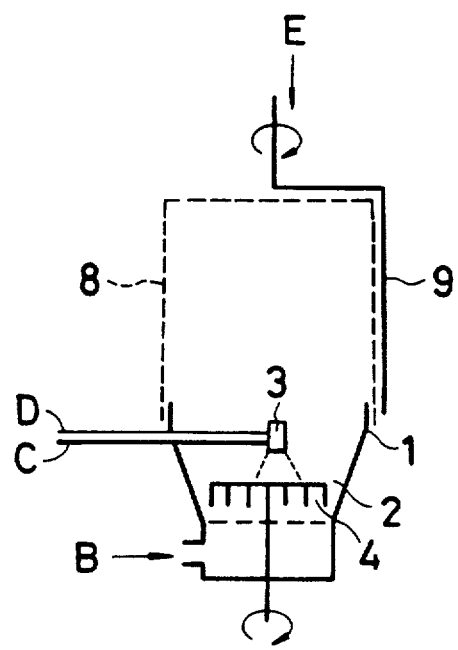
FIG. 1 is a sectional view showing an example of the present invention.
Figure 7:
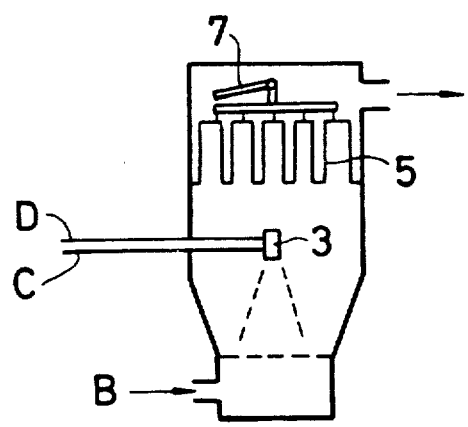

FIG. 1 is a sectional view showing an example of the batchwise fluidized bed granulator of the present invention. The difference of this granulator from that of FIG. 7 is that the portion of the housing other than the lower and bottom portions is formed by a porous membrane 8. Further, the use of this porous membrane for the housing causes no accompanying of powder in exhaust gas and accordingly requires no bag filter 5 for recovery of fine powder as used in FIG. 7.

In the granulator of FIG. 1 a powder material A is fed into a housing 1 and forms a fluidized bed 2 together with hot air B blown into the housing 1 at the bottom. Into the fluidized bed 2 is sprayed a binder fluid C together with compressed air D, from a nozzle 3, whereby granules as a granulation product are produced. An agitator 4 is provided in the fluidized bed 2 to maintain the fluidized state of the bed 2 well. The gas (e.g. hot air) blown into the housing 1 is separated from the powder via a porous membrane 8 and discharged to the outside. During the operation of the granulator, compressed air E is blown against the porous membrane 8 from outside through a large number of holes formed in an air sweeper 9 which is a pipe, whereby the powder adhering to the inside of the porous membrane 8 is wiped off. Therefore, the present invention enables an operation of long time.

Figure 2:
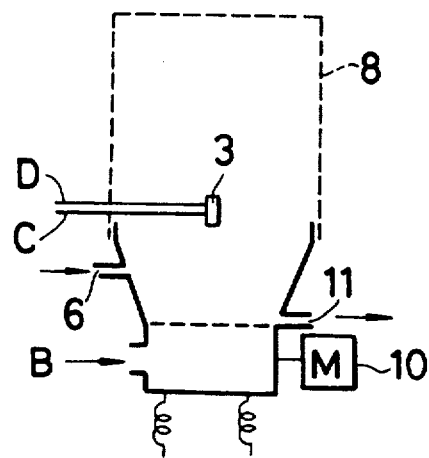
FIG. 2 is a sectional view showing another example of the present invention.

FIG. 2 is a sectional view showing an example of the continuous fluidized bed granulator of the present invention. In this bed granulator, instead of using compressed air to wipe off the powder adhering to the porous membrane, an eccentric motor 10 is provided at the bottom of the bed granulator to form a vibro-fluidized bed and the vibration of the bed is transmitted to the porous membrane 8 to drop the powder depositing on the porous membrane 8.

As the method for wiping off the powder depositing on the porous membrane 8, there can also be adopted a pulse air method or a method using a vibrator to directly or indirectly vibrate the porous membrane 8.

The fluidized bed granulator of the present invention can be not only a batchwise type and a continuous type as mentioned above but also a semi-batchwise type.

When there is used a powder liable to cause blocking during fluidized granulation, such as amino acid or the like, it is preferable that the present granulator have within the fluidized bed an agitator consisting of, for example, a shaft and a number of rods fixed thereto, or a shaft, a stem fixed thereto and a number of rods fixed to the stem, as shown in FIG. 1.

EXAMPLE 1

There was used a fluidized bed granulator as shown in FIG. 1 whose fluidized bed had a top diameter of 600 mm and a bottom diameter of 230 mm and the upper portion of which housing was formed by a porous membrane having a filtration area of 2.1 $m^2$. As a powder material, an amino acid-based having an average particle diameter of 50 $\mu$m was fed into the granulator at a rate of 6 kg/hr. As a binder fluid, a solution containing 30% by weight of dextrine was sprayed at a rate of 1.8 kg/hr. The porous membrane used was a laminate of a unwoven cloth made of a heat-resistant nylon and a polytetrafluoroethylene. The amount of hot air fed was 180 $m^3$/hr. The inlet temperature of hot air was 70° C. and the exhaust gas temperature was 50° C. The pressure difference between the inside and the outside of the porous membrane was 130 mm Aq.

The rotation speed of the air sweeper was 2 rpm. The amount of compressed air fed was 50 $m^3$/hr and its pressure was 0.1 $kg/cm^2$.

In the fluidized bed was provided a comb-shaped agitator consisting of a stem fixed to a rotating shaft and a number of rods fixed to the stem.

An operation was conducted under the above conditions. The granulation time was 55 minutes, the granulation product had an average particle diameter of 200 $\mu$m, and the recovery was 98%.

There was little powder deposition on the porous membrane, and the time required for disassembling-washing-assembling was as short as 0.5 hour.

COMPARATIVE EXAMPLE 1

Figure 6:
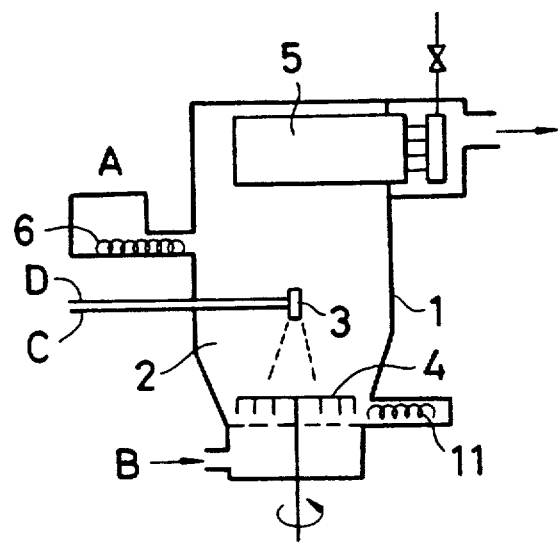

An operation was conducted under the same conditions as in Example 1 except that an bed granulator shown in FIG. 6 was used as a batchwise type and a bag filter having a filtration area of 2.1 $m^2$ was used.

The granulation time was 45 minutes and the granulation product had an average particle diameter of 200 $\mu$m. However, the amount of powder deposited on bag filter was large and the recovery was 45%.

Moreover, the time required for disassembling-washing-assembling was 1.5 hours.

EXAMPLE 2

Figure 3:
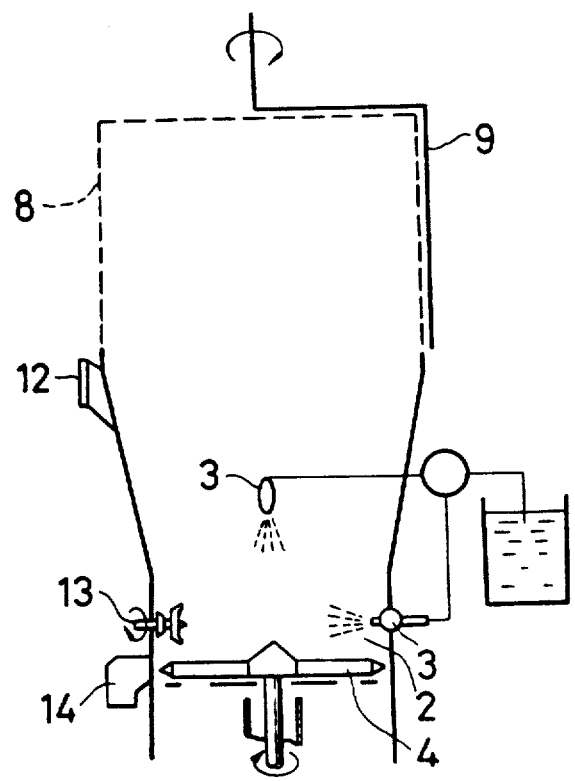
FIG. 3 is a sectional view showing still another example of the present invention.

There was used a fluidized bed granulator as shown in FIG. 3 which was a combination of agitation granulation, tumbling granulation and ordinary fluidized granulation, whose fluidized bed had a top diameter of 950 mm and a bottom diameter of 350 mm and the upper portion of which housing was formed by a porous membrane 8 having a filtration area of 6 m$^2$. As a powder material, 21 kg of lactose and 9 kg of corn starch were fed from a material inlet 12. As a binder fluid, an aqueous solution containing 5% by weight of hydroxypropylcellulose (HPC-L) was sprayed from a nozzle 3 at a rate of 250 ml/min for 42 minutes. Then, drying was effected for 20 minutes. The porous membrane used was an unwoven cloth made of a heat-resistant nylon [Nomex (trade name) of Du Pont]. The amount of hot air fed was 600 m$^3$/hr. The inlet temperature of hot air was 75° C. and the exhaust gas temperature was 30° C.

The pressure difference between the inside and the outside of the porous membrane 8 was 80 mm Aq.

The rotation speed of the air sweeper 9 was 2 rpm. The amount of compressed air supplied was 150 m$^3$/hr and the pressure was 0.15 kg/cm$^2$.

In the fluidized bed 2 were provided a main agitator 4 (diameter=300 mm, rotation speed=750 rpm) and an auxiliary agitator 13 (diameter=80 mm, rotation-speed=1450 rpm). 14 is a product outlet.

An operation was conducted under the above conditions. The granulation time was 37 minutes. The average particle diameter changed from 80 μm (material powder) to 480 μm (granulation product). The drying time for granulation product was 20 minutes. The recovery was 98.5%. The time required for disassembling-washing-assembling was 0.8 hour.

COMPARATIVE EXAMPLE 2

Figure 4:
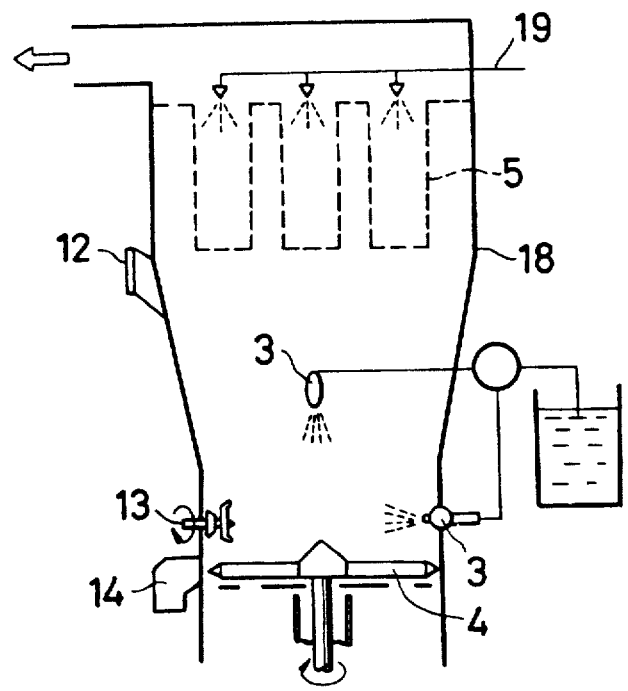
FIGS. 4-7 are sectional views showing examples of conventional apparatuses.
Figure 5:
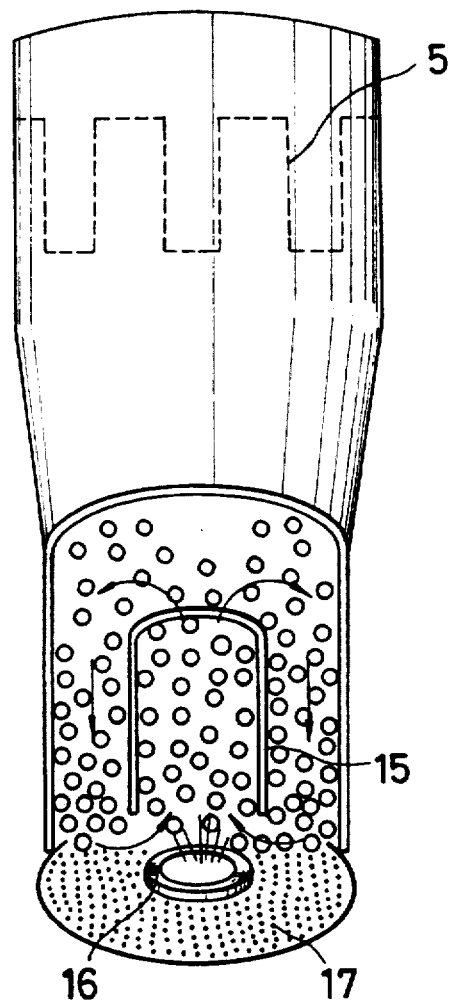

An operation was conducted under the same conditions as in Example 2 except that as shown in FIG. 4, the porous membrane 8 used for the housing in FIG. 3 (Example 2) was changed to a steel plate 18 and there were newly used a bag filter 5 (filtration area=6 m$^2$) and a pulse air device 19.

The granulation time was 35 minutes. The granulation product had an average particle diameter of 480 μm. The drying time for granulation product was 20 minutes. The recovery was 95%. The required for disassembling-washing-assembling was 1.5 hours.

INDUSTRIAL APPLICABILITY

As described above, the fluidized bed granulator of the present invention, using a porous membrane for a portion or the whole portion of the housing, causes no blocking in the fluidized bed, requires no bag filter for recovery of fine powder, and can easily replace the porous membrane and accordingly can effect product switch-over rapidly.

We claim:

1. A fluidized bed granulator for granulating powder, comprising:
   a chamber having top and side portions formed of a porous membrane;
   spray means disposed in said chamber for spraying a binder fluid on the powder; and
   a fluidized bed disposed in said chamber for maintaining the powder in a fluidized state;
   wherein said porous membrane is expanded during operation of the fluidized bed granulator by a continuous application of air, which application maintains a positive pressure inside said chamber.

2. The fluidized bed granulator of claim 1, wherein said porous membrane is fitted detachably.

3. The fluidized bed granulator of claim 1, wherein said porous membrane is foldable for storage.

4. A fluidized bed granulator for coating a powder, comprising:
   a chamber having top and side portions formed of a porous membrane;
   spray means disposed in said chamber for spraying a coating fluid on the powder; and
   wherein said porous membrane is expanded during operation of the fluidized bed granulator by a continuous application of air, which application maintains a positive pressure inside said chamber.

5. The fluidized bed granulator of claim 4, wherein said porous membrane is fitted detachably.

6. The fluidized bed granulator of claim 4, wherein said porous membrane is foldable for storage.

* * * * *